United States Patent
Headings et al.

(10) Patent No.: US 12,374,340 B2
(45) Date of Patent: Jul. 29, 2025

(54) INDIVIDUAL RECOGNITION USING VOICE DETECTION

(71) Applicant: INTERNATIONAL BUSINESS MACHINES CORPORATION, Armonk, NY (US)

(72) Inventors: Ethan S. Headings, Columbus, OH (US); Feng-wei Chen, Cary, NC (US); Neha S Deshpande, Cary, NC (US); Madhavi Kolachala, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 17/806,286

(22) Filed: Jun. 10, 2022

(65) Prior Publication Data
US 2023/0402041 A1    Dec. 14, 2023

(51) Int. Cl.
| G10L 17/22 | (2013.01) |
| G10L 17/02 | (2013.01) |
| G10L 17/06 | (2013.01) |
| G10L 25/78 | (2013.01) |

(52) U.S. Cl.
CPC .............. *G10L 17/22* (2013.01); *G10L 17/02* (2013.01); *G10L 17/06* (2013.01); *G10L 25/78* (2013.01)

(58) Field of Classification Search
CPC ......... G10L 17/22; G10L 17/02; G10L 17/06; G10L 25/78; G10L 15/26; G10L 25/63; G10L 17/00; G06Q 10/10; G06Q 30/01; G06Q 50/01; G06F 40/30
See application file for complete search history.

(56) References Cited

U.S. PATENT DOCUMENTS

| 8,571,865 B1 * | 10/2013 | Hewinson ............... G10L 17/06 704/270 |
| 10,217,465 B2 * | 2/2019 | Grahm ..................... G10L 25/54 |
| 10,460,728 B2 | 10/2019 | Anbazhagan |

(Continued)

FOREIGN PATENT DOCUMENTS

| EP | 2899609 A1 | 7/2015 |
| WO | 2009094415 A1 | 7/2009 |

OTHER PUBLICATIONS

Amazon, "BytNotes", https://www.amazon.com/MSGA-bytNotes/dp/B004Q7F7NS, https://www.amazon.com/MSGA-bytNotes/dp/B004Q7F7NS, accessed Mar. 29, 2022, pp. 1-4.

(Continued)

*Primary Examiner* — Daniel C Washburn
*Assistant Examiner* — Sean E Serraguard
(74) *Attorney, Agent, or Firm* — CHIP LAW GROUP

(57) ABSTRACT

A method, a computer program product, and a computer system determine a name of an individual based on voice detection. The method includes determining voice characteristics of a voice of the individual based on an audio input received and recorded via an audio input device. The method includes comparing the voice characteristics of the voice to further voice characteristics of voice profiles. The method includes as a result of the voice and one of the voice profiles meeting a similarity threshold, determining a name associated with the one of the voice profile. The method includes providing the name to a user who is having a conversation with the individual.

11 Claims, 5 Drawing Sheets

(56) References Cited

U.S. PATENT DOCUMENTS

| | | | |
|---|---|---|---|
| 11,094,316 B2 | 8/2021 | Visser | |
| 2008/0043996 A1* | 2/2008 | Dolph | H04N 21/4334 379/388.07 |
| 2014/0188846 A1* | 7/2014 | Kurabayashi | G06F 16/156 707/752 |
| 2016/0098992 A1* | 4/2016 | Renard | G10L 15/30 704/275 |
| 2016/0329053 A1* | 11/2016 | Grahm | G06F 3/017 |
| 2021/0043216 A1* | 2/2021 | Wang | G10L 17/18 |

OTHER PUBLICATIONS

Apple, "Remember App", https://itunes.apple.com/us/app/remember-app-remember-everyone-you-met/id1096350872?mt=8, accessed Mar. 29, 2022, pp. 1-4.

Contacts Journal, "Contacts Journal CRM", http://www.contactsjournal.com/, accessed Mar. 29, 2022, pp. 1-9.

Das et al., "Voice Recognition System, Speech-To-Text", https://www.researchgate.net/publication/304651244, Jul. 1, 2018, pp. 1-6.

Disclosed Anonymously, "Method for Identifying IoT Devices to Enable Seamless Transfer of Chat Sessions", IPCOM000263406D; Aug. 27, 2020, pp. 1-5.

Disclosed Anonymously, "Dynamic Adjustment of Hotword Detection Threshold", IPCOM000257597D; Feb. 22, 2019, pp. 1-7.

Disclosed Anonymously, "Intelligent Voice Assistant Extended Through Voice Relay System", IPCOM000255132D; Sep. 4, 2018, pp. 1-23.

http://namerick.com/, "Remember Names", accessed Mar. 29, 2022, pp. 1-3.

http://namesharkapp.com/, "Name Shark", Mar. 29, 2022, pp. 1-6.

http://www.nameorize.com/, "Namorize", accessed Mar. 29, 2022, p. 1.

Mell et al., "The NIST Definition of Cloud Computing", National Institute of Standards and Technology, Special Publication 800-145, Sep. 2011, pp. 1-7.

Mphego, "Designing a Smart Home Automation With Voice Recognition Using a Rasberry PI and Arduino", https://dev.to/mmphego/smart-home-automation-using-raspberry-pi-and-arduino-4k71, Jun. 13, 2018, pp. 1-116.

Sudharsan, et al., "Smart Speaker Design and Implementation With Biometric Authentication and Advanced Voice Interaction Capability", https://www.researchgate.net/publication/338984616, Dec. 2019, pp. 1-14.

* cited by examiner

_US 12,374,340 B2_

INDIVIDUAL RECOGNITION USING VOICE DETECTION

BACKGROUND

The exemplary embodiments relate generally to voice processing, and more particularly to identifying scenarios where a user does not recall an individual's name so that the individual's name is determined and provided to the user.

A social scenario may involve a first individual meeting a second individual to have a conversation. The conversation may begin with greetings or other initial conversation starters. The greeting may entail the first individual recognizing and stating the second individual's name and vice versa. As a result of the first individual forgetting the second individual's name, the first individual may be socially embarrassed if the first individual has already met the second individual and learned the second individual's name, more so if the second individual recalls the first individual's name and supplies the first individual's name in the second individual's greeting. When the conversation is had in-person or other setting where the individuals may view each other, the social embarrassment may further increase with the second individual being directly present and capable of reading social cues of the first individual from having forgotten the second individual's name.

SUMMARY

The exemplary embodiments disclose a method, a computer program product, and a computer system for determining a name of an individual based on voice detection. The method comprises determining voice characteristics of a voice of the individual based on an audio input received and recorded via an audio input device. The method comprises comparing the voice characteristics of the voice to further voice characteristics of voice profiles. The method comprises as a result of the voice and one of the voice profiles meeting a similarity threshold, determining a name associated with the one of the voice profile. The method comprises providing the name to a user who is having a conversation with the individual.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
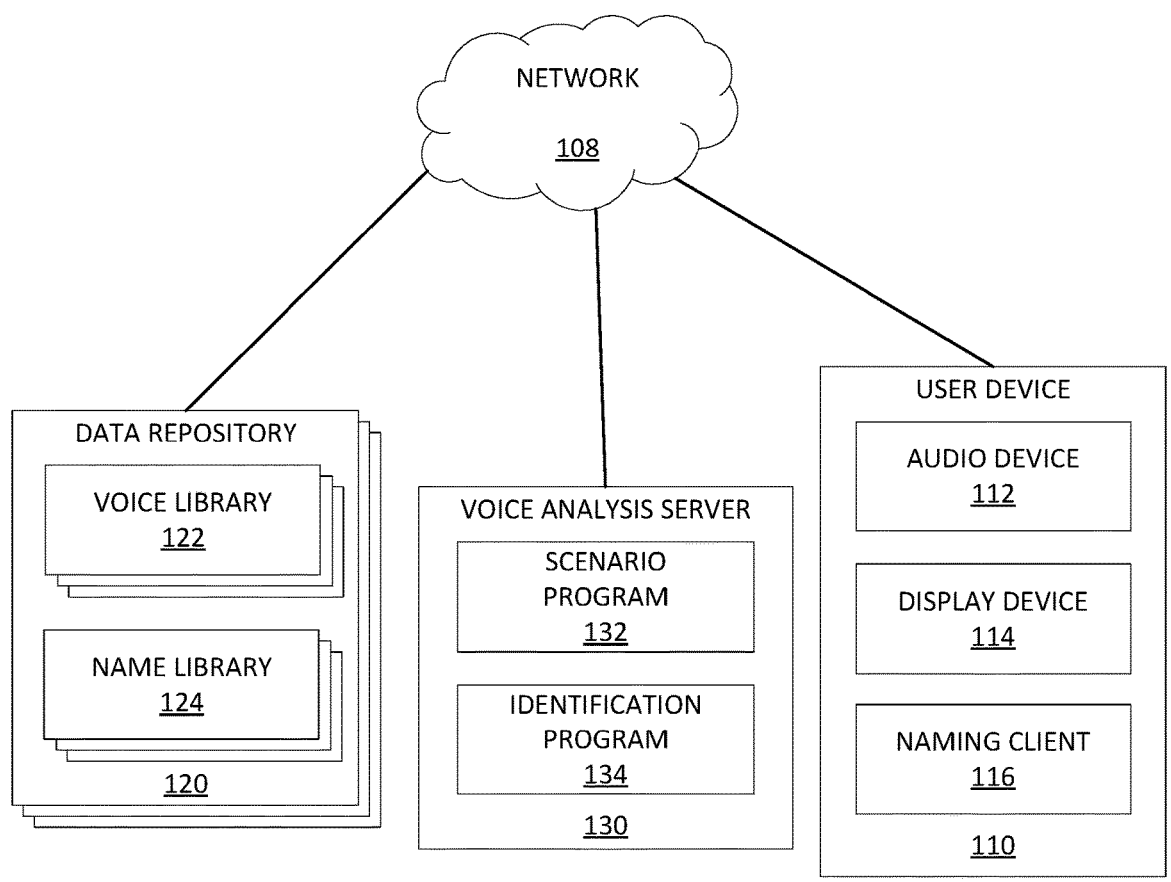
FIG. 1 depicts an exemplary schematic diagram of an individual recognition system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for preventing social embarrassment during a time when an individual does not recall a name of a further individual with whom the individual is conversing. Accordingly, the exemplary embodiments provide a mechanism for determining the name of the further individual based on voice detection and processing data corresponding to a voice of the further individual. The exemplary embodiments are further configured to determine situations where the features of determining the name of the further individual may be required to prevent the social embarrassment. Key benefits of the exemplary embodiments may include preventing social embarrassment by providing the individual with the name of the further individual such that the further individual may not be aware that the individual has forgotten the name of the further individual. Detailed implementation of the exemplary embodiments follows.

Conventional approaches have provided a variety of mechanisms or instructions for recalling an individual's name. In a first type, the conventional approaches leverage mnemonics so that an individual may more easily recall the name of a further individual. For example, a conventional approach of the first type may simply utilize repetition and mnemonics with various tricks for an individual to remember names. In another example, a conventional approach of the first type may flash reminders of the further individuals to review names and details until a subsequent meeting. In a further example, a conventional approach of the first type allows an individual to create a log or notes of the further individuals that the individual may refer to recall information. However, the conventional approaches of the first type rely on mnemonics and active manual steps. The conventional approaches also do not automatically determine when scenarios arise from which a name of an individual is required nor identify missing greetings to solve social embarrassment in a live manner.

In a second type, the conventional approaches leverage pictures of photos. For example, a conventional approach of the second type may store photos and information to create and share groups. However, the conventional approaches of the second type must utilize imagery such as photos for an individual to recall a name. The conventional approaches also do not automatically determine when scenarios arise from which a name of an individual is required nor identify missing greetings to solve social embarrassment in a live manner.

There have been further types of conventional approaches that have been used to allow an individual to recall a name. For example, a conventional approach provides a wearable device from which body movement triggers voice capturing. In another example, a conventional approach provides audible spoken name pronunciations which is directed solely to finding the correct name pronunciation for an individual. However, these further conventional approaches do not automatically determine when scenarios arise from which a name of an individual is required nor identify missing greetings to solve social embarrassment in a live manner.

The exemplary embodiments are configured to determine whether a current situation involving an individual with a further individual entails a missing greeting. Specifically, the missing greeting may include the individual omitting saying the name of the further individual. In determining when such scenarios arise, the exemplary embodiments may process the conversation and the voice of the further individual to determine the name of the further individual. In this manner, the exemplary embodiments may avoid socially embarrassing situations for the individual.

The exemplary embodiments are described with regard to an individual conversing with another individual from a moment the individuals greet one another. As such, the exemplary embodiments may apply to an in-person conversation, video meetings, audio only meetings, etc. where the conversation is performed live. However, the implementation to live conversations is only exemplary. The exemplary embodiments may also be utilized and/or modified during a non-live time when the individual wants or needs to recall a name of the further individual. For example, the further individual may leave a voicemail but omit to mention the name or the message may be corrupted so that the portion where the name is uttered is unclear. The exemplary embodiments may use the voice in the voicemail to determine the name of the further individual.

The exemplary embodiments are described with regard to individuals and the names of the individuals. To differentiate between the individuals having a conversation, a first individual is referred to herein as a "user" who utilizes the features of the exemplary embodiments. The second individual with whom the user has a conversation is referred to herein simply as the "individual" whose voice is used by the exemplary embodiments to determine the individual's name.

The use of names is also used for illustrative purposes. The exemplary embodiments may be utilized and/or modified to provide information for any identification that the individual has assumed. The exemplary embodiments may also be utilized and/or modified to provide other types of information for the individual when recollection of such information may prevent social embarrassment (e.g., dates such as a birthday, an anniversary, a noteworthy date to the individual, etc., names of associations to the individual such as a spouse, a partner, a child, a relative, etc., likes/dislikes of the individual, etc.).

FIG. 1 depicts an individual recognition system 100, in accordance with the exemplary embodiments. According to the exemplary embodiments, the individual recognition system 100 may include a user device 110, one or more data repositories 120, and a voice analysis server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the individual recognition system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the individual recognition system 100 that do not utilize the network 108.

In the exemplary embodiments, the user device 110 may include an audio device 112, a display device 114, and a naming client 116, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the user device 110 is shown as a single device, in other embodiments, the user device 110 may be comprised of a cluster or plurality of computing devices, in a modular manner, etc., working together or working independently. The user device 110 is described in greater detail as a hardware implementation with reference to FIG. 3 (e.g., data processing according to the exemplary embodiments being performed by processor 02), as part of a cloud implementation with reference to FIG. 4 (e.g., the device 110 according to the exemplary embodiments being represented by the laptop computer 54C), and/or as utilizing functional abstraction layers for processing with reference to FIG. 5 (e.g., workload layer 90 including voice analysis processing 96 according to the exemplary embodiments). The user device 110 may be utilized by a user who is conversing with an individual and utilizing the features of the exemplary embodiments.

In the exemplary embodiments, the audio device 112 may be configured to receive audio and/or output audio. For example, the audio device 112 may include an audio input device such as a microphone. The audio input device may be configured to capture audio information of the surroundings, specifically an area around the audio input device that is in proximity to the user. In another example, the audio device 112 may include an audio output device such as a speaker, headphones, etc. The audio output device may be configured to output audio that is played back for the user. The audio input device and the audio output device may be implemented as a single component or as separate components and may be incorporated into the user device 110 or associated in a modular manner with the user device 110 utilizing wired or wireless connections.

As will be described in further detail below, with regard to utilizing the features of the exemplary embodiments, the audio input device of the audio device 112 may be configured to operate in a plurality of states. The plurality of states may factor power considerations such as when the user device 110 is mobile and utilizing a portable or otherwise limited power supply. For example, the states may include a passive state and an active state. In the passive state, the audio device 112 may require less power and be configured to detect audio inputs. The audio device 112 may provide results of the detected audio inputs for processing including determining when the audio inputs correspond to the user having a conversation with the individual. For example, a decibel level of the audio inputs may indicate that the conversation is being performed. Accordingly, in detecting audio inputs that have a volume that is at least a decibel threshold, the audio device 112 may be instructed to change from the passive state to the active state so that any subsequent audio input is received with greater accuracy. To also ensure that the audio input was not merely a momentary sound satisfying the decibel threshold, there may also be a time requirement where the decibel threshold is maintained for a period of time. While in any state, the audio device 112 may also be configured to begin recording audio inputs upon detection to prepare for subsequent operations.

In another implementation, the user device 110 may be configured to operate in a plurality of states. For example, the states may include an idle state and an active state. The audio input device of the audio device 112 may continuously be activated while the user device 110 is activated, regardless of the state. Accordingly, the audio input device may continuously receive and/or record audio inputs that may be processed in the idle state until a trigger event occurs (e.g., a volume of the audio input reaching the decibel threshold).

In the exemplary embodiments, the display device 114 may be any device configured to show visual information to a user of the user device 110. As the exemplary embodiments are directed to ultimately providing a name of the individual for identified scenarios involving the user, the exemplary embodiments may generate an output that is provided on the display device 114. For example, for the individual who has been identified by a voice profile, the output may include a spelling of the name, a pronunciation of the name, an option to hear the pronunciation of the name (e.g., by selecting this option, the audio output device may be utilized to play back an audio file that includes the pronunciation of the name), any indicated nicknames, etc. If properly configured, the individual identified via the voice profile may also have a photograph on file. The exemplary embodiments may generate the output to further provide this photograph to be shown on the display device 114 (e.g., for the user to confirm the individual has been properly identified by the exemplary embodiments, especially when the individual is visible to the user during the conversation).

In the exemplary embodiments, the naming client 116 may act as a client in a client-server relationship and may be a software, hardware, and/or firmware based application capable of exchanging data for the user to utilize the features of the exemplary embodiments via the network 108. In embodiments, the naming client 116 may provide a user interface shown on the display device 114 in which the generated output is shown while performing background operations in preparing data to be processed. In the background operations, the naming client 116 may receive audio inputs from the audio input device of the audio device 112. Through the client-server relationship, the naming client 116 may prepare the audio inputs for further processing. The naming client may also interact with one or more components of the individual recognition system 100, and utilize various wired and/or wireless connection protocols for data transmission and exchange associated with data used for image comparison analysis, including Bluetooth, 2.4 gHz and 5 gHz internet, near-field communication, Z-Wave, Zigbee, etc.

In the exemplary embodiments, the data repository 120 may include one or more voice libraries 122 and one or more name libraries 124 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the data repository 120 is shown as a single device, in other embodiments, the data repository 120 may be comprised of a cluster or plurality of electronic devices, in a modular manner, etc., working together or working independently. While the data repository 120 is also shown as a separate component, in other embodiments, the data repository 120 may be incorporated with one or more of the other components of the individual recognition system 100. For example, the data repository 120 may be incorporated in the voice analysis server 130. Thus, access to the data repository 120 by the voice analysis server 130 may be performed locally. The data repository 120 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the voice library 122 may include voice profiles associated with a name of an individual so that a match to the voice profile through operations performed by the exemplary embodiments may determine the name. As will be described in further detail below, the voice profiles may be associated with various voice characteristics where a combination of the voice characteristics may provide a similarity score to identify an individual and the individual's name. For example, the voice characteristics may include pitch, tone, dialect, etc. In determining the similarity of these characteristics on an individual and/or holistic manner, the voice profile may be identified to which the individual's name is associated. The voice profiles may be generated based on samples that may be provided for those interested in utilizing the features of the exemplary embodiments. For example, individuals who install the naming client 116 may be prompted to voluntarily participate and provide the voice samples. In another example, individuals associated with an organization may request the voice samples be provided for use in the exemplary embodiments. The voice sample may be the individual stating only the individual's name, a statement including the name (e.g., "Hi, my name is ABC."), an optional statement for a name preference (e.g., "You can call me XYZ."), etc.

The voice library 122 may also include speech patterns. The speech patterns may include specific words or phrases that may be used in conversation. The speech patterns may therefore provide contextual information with regard to the conversation between the user and the individual. For example, the speech patterns may be evaluated to determine the portions of a conversation directed to a greeting or other initial exchange of communications when a name is likely to be used.

The speech patterns may also be indicative of amity levels. The speech patterns may be directed in a general manner or may be specific to the user and the individual. With speech patterns that are specific to a user and individual, the contextual information may also be specific to the respective person in determining an amity level specific to that user and/or the individual. Therefore, as a result of identifying a specific speech pattern or set of speech patterns used by the user and/or the individual, a corresponding amity level may be determined for the conversation between the user and individual. The speech patterns may also be evaluated by incorporating the voice characteristics to further determine the amity level. The amity level may further be determined based on other available information such as previous encounters, previous conversations, frequency between meetings, a time since a previous meeting, a time since a first meeting, etc.

In the exemplary embodiments, the name library 124 may include name information and association information where the association information associates a voice profile with the name information. In this manner, identification of a voice profile (e.g., through a similarity analysis with the voice of the individual) may also identify the corresponding name and vice versa. The name information may also include further information such as pronunciation information of the name, an audio file playing back the name being spoken, etc.

In the exemplary embodiments, the voice analysis server 130 may include a scenario program 132 and an identification program 134, and act as a server in a client-server relationship with the naming client 116 as well as be in a communicative relationship with the data repository 120. The voice analysis server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the voice analysis server 130 is shown as a single device, in other embodiments, the voice analysis server 130 may be comprised of a cluster or plurality of computing devices, working together or working independently. While the voice analysis server 130 is also shown as a separate component, in other embodiments, the operations and features of the voice analysis server 130 may be incorporated with one or more of the other components of the individual recognition system 100. For example, the operations and features of the voice analysis server 130 may be incorporated in the user device 110. The voice analysis server 130 is described in greater detail as a hardware implementation with reference to FIG. 3 (e.g., data processing according to the exemplary embodiments being performed by processor 02), as part of a cloud implementation with reference to FIG. 4 (e.g., the device 110 according to the exemplary embodiments being represented by the desktop computer 54B), and/or as utilizing functional abstraction layers for processing with reference to FIG. 5 (e.g., workload layer 90 including voice analysis processing 96 according to the exemplary embodiments).

In the exemplary embodiments, the scenario program 132 may be a software, hardware, and/or firmware application configured to determine scenarios where the user may be conversing with an individual. For conversations that are identified, the scenario program 132 may further be configured to determine characteristics of the conversation that may trigger the features of the exemplary embodiments in determining a name of the individual. As will be described in further detail below, the scenario program 132 may receive audio inputs from the audio device 112 that is monitoring audio information of the user and any individual with whom the user may be holding a conversation. The scenario program 132 may process the audio inputs to determine whether there is a conversation, determine an amity level of the conversation, and determine whether the user spoke a named greeting of the individual (e.g., whether the named greeting is present or absent). Based on the results of these determinations, the scenario program 132 may prepare information to be used in subsequent processing. For example, the scenario program 132 may prepare the audio inputs associated with the voice of the individual and break down the information into metadata (e.g., pitch, tone, dialect, etc.).

In the exemplary embodiments, the identification program 134 may be a software, hardware, and/or firmware application configured to receive the information from the scenario program 132 to perform subsequent operations. The subsequent operations may include using the metadata of the voice to perform voice matching via the voice profiles. As a result of determining a probable match, the identification program 134 may generate an output including the name of the individual. As noted above, the identification program 134 may also include further information such as a pronunciation guide of the name (e.g., a phonetic pronunciation), an option for an audio playback of the pronunciation of the name, etc.

It is noted that the exemplary embodiments may be configured to capture audio inputs. For example, a sample of the voice of the individual may be recorded for the subsequent operations to be performed. With the audio device 112 monitoring for audio inputs via the audio input device, the audio device 112 may record the audio inputs that may include the individual's voice. This recording may subsequently be provided to the voice analysis server 130. The exemplary embodiments may include security measures to utilize such recordings only for the purpose of determining a name of the individual. As such, the exemplary embodiments may permanently delete the recording of the voice of the individual when the operations have completed or the portion of the operations requiring use of the recording has ended.

As noted above, the implementation shown in FIG. 1 where the user device 110 coordinates with the voice analysis server 130 over the network 108 is only for illustrative purposes and other configurations may be utilized. In another implementation of the exemplary embodiments, the individual recognition system 100 may be embodied within the user device 110. For example, the functionalities of the voice analysis server 130 may be incorporated in the user device 110. The data repository 120 may also be incorporated in the user device 110. In this manner, whether or not a network connection is available, the user may utilize the features of the exemplary embodiments so long as the user device 110 is on the user's person. With regard to updating information in the data repository 120, the user device 110 may utilize a connection to a remote source that has up-to-date information and receive the updated information of the data repository 120. The operations of the voice analysis server 130 may remain being performed locally in such an implementation.

Figure 2:
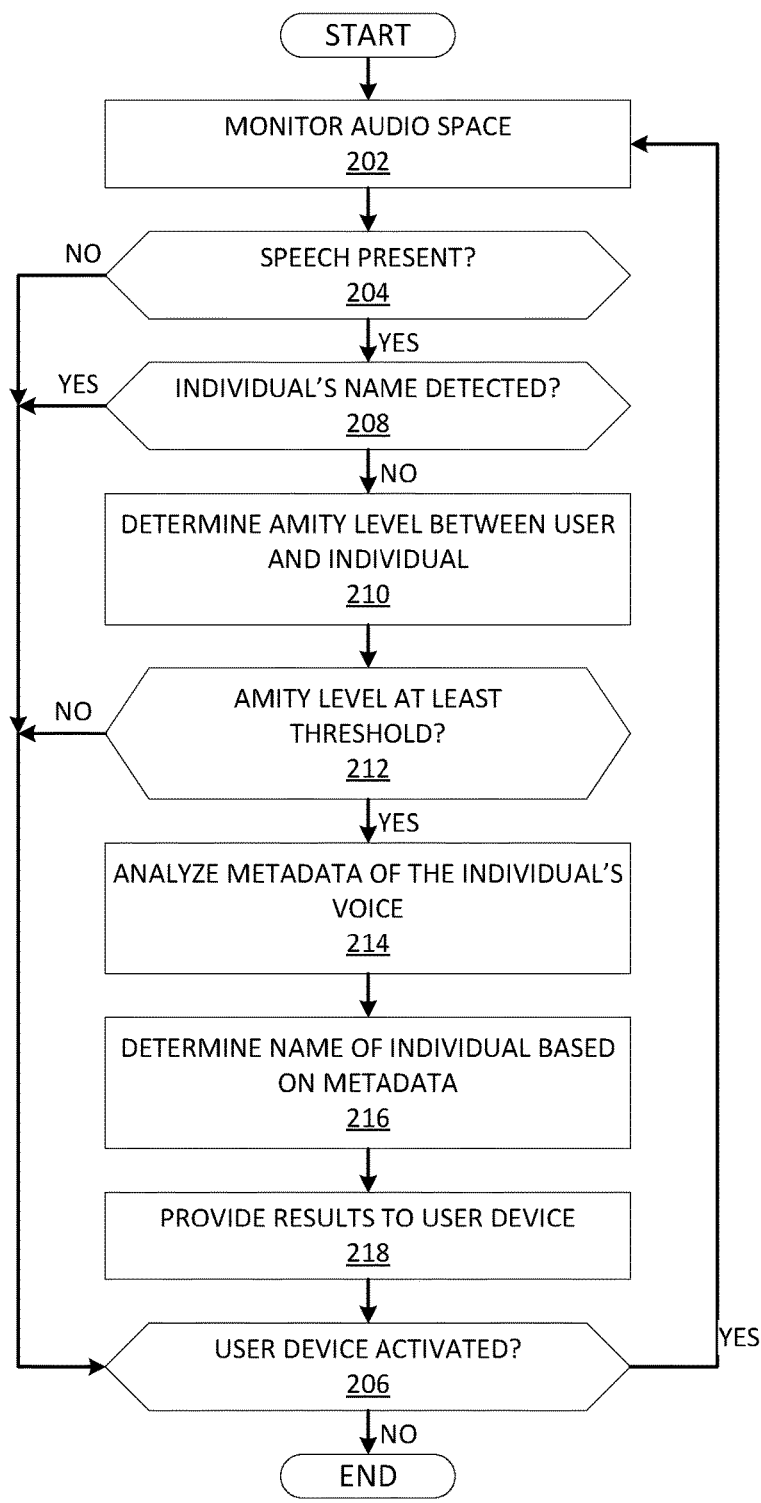
FIG. 2 depicts an exemplary flowchart of a method illustrating the operations of a voice analysis server 130 of the individual recognition system 100 in determining a name of an individual based on voice detection, in accordance with the exemplary embodiments.

FIG. 2 depicts an exemplary flowchart of a method 200 illustrating the operations of the voice analysis server 130 of the individual recognition system 100 in determining a name of an individual based on voice detection, in accordance with the exemplary embodiments. The method 200 may relate to operations that are performed by the scenario program 132 and the identification program 134. The method 200 will be described from the perspective of the voice analysis server 130 and for a scenario where the user associated with the user device 110 is speaking with the individual. As noted above, the conversation may occur in-person, over a video chat, over an audio communication, etc. so long as the individual's voice may be received as an audio input by the audio input device of the audio device 112 of the user device 110.

The voice analysis server 130 may monitor an audio space (step 202). It is noted that the monitoring of the audio space by the voice analysis server 130 may be performed indirectly via the user device 110. The user device 110 may include the audio device 112 that may include a component such as an audio input device from which audio inputs in proximity to the user may be monitored. As an audio input is detected, the audio device 112 may capture or record the audio input. Subsequently, the voice analysis server 130 may receive the recorded audio input for subsequent processing. In this manner, the voice analysis server 130 may monitor the audio space around the user.

The voice analysis server 130 may determine whether speech is present or detected in the audio space (decision 204). The voice analysis server 130 may process the audio input captured by the audio device 112. The user device 110 may sit in an idle state until the audio input is captured. In processing the audio input, the voice analysis server 130 may determine a presence of speech in the audio space. For example, the voice analysis server 130 may be configured with speech recognition techniques, voice-to-text techniques, etc. where words may be identified. Speech may also encompass utterances that may reflect a conversation taking place (e.g., non-word sounds of agreement, disagreement, acknowledgement, etc. indicative of a conversation between the user and individual). Accordingly, the voice analysis server 130 may also determine such utterances to determine whether the user and the individual are having a conversation.

As a result of the voice analysis server 130 determining that speech is not present (decision 204, "NO" branch), the voice analysis server 130 may determine whether the user device 110 or components used by the user device 110 for the exemplary embodiments are still activated (decision 206). As a result of the user device 110 being deactivated (decision 206, "NO" branch), the exemplary embodiments may cease monitoring the audio space. As a result of the user device 110 still being active (decision 206, "YES" branch), the user device 110 continues to monitor the audio space (step 202).

As a result of the voice analysis server 130 determining that speech is present (decision 204, "YES" branch), the voice analysis server 130 may detect whether the individual's name has been said by the user (decision 208). For example, the individual's name may or may not have been said by the user. In another example, the individual may have provided the individual's own name. After a prescribed time (e.g., an initial timeframe having a duration in which a name has a predetermined probability of being stated), the voice analysis server 130 may process the audio inputs to determine whether the individual's name is said whether they relate to a named greeting or other portion of the conversation. As a result of the voice analysis server 130 determining that the individual's name has been detected (decision 208, "YES" branch), the voice analysis server 130 may determine whether the user device 110 is still activated (decision 206). That is, if the user has the individual's name, the voice analysis server 130 may assume that the user recalls the individual's name. If the individual said the individual's own name, the voice analysis server 130 may assume that the user has recalled or is now recalling the individual's name. Therefore, the voice analysis server 130 may not be required to perform subsequent operations.

It is noted that the voice analysis server 130 may also determine whether the detected speech and the audio inputs correspond to a conversation being held by the user. For example, the audio device 112 may have detected a conversation by others who are near the user. The voice analysis server 130 may determine the user device 110 from which the audio input is being received. The user device 110 may be identified along with the user associated with the user device 110. The voice analysis server 130 may verify that at least one voice in the conversation is that of the user using substantially similar operations as those described herein.

As a result of the voice analysis server 130 determining that the individual's name has not been detected (decision 208, "NO" branch), the voice analysis server 130 may determine an amity level between the user and the individual (step 210). In processing the speech patterns of the audio input between the user and the individual (e.g., using natural language processing to detect the speech patterns), the voice analysis server 130 may determine a relationship of the user and the individual based on the amity level. The voice analysis server 130 may categorize the amity level into a plurality of categories. For example, the voice analysis server 130 may utilize three amity levels ranging from stranger, acquaintance, and friend. The voice analysis server 130 may perform various calculations that define ranges of the amity levels such that a result of further calculating an amity value of a current conversation results in falling into one of these ranges. However, it is noted that any number of amity levels may be used by the exemplary embodiments that may extend the range of relationships or include further types of relationships in between these noted amity levels. In utilizing the different amity levels, the voice analysis server 130 may determine a path to proceed to subsequent operations.

The voice analysis server 130 may determine the amity level utilizing the audio inputs captured by the audio device 112. For example, the speech patterns of the audio input may include phrases indicative of a first meeting. In this regard, the voice analysis server 130 may determine that the amity level is stranger. In another example, the speech patterns of the audio input may include phrases of informality, intimacy, etc. In this regard, the voice analysis server 130 may determine that the amity level is friend. In a further example, the speech patterns of the audio input may include phrases indicative of familiarity greater than that of a stranger (e.g., at least one previous meeting has taken place) but remains formal or semi-formal. In this regard, the voice analysis server 130 may determine that the amity level is acquaintance.

The voice analysis server 130 may determine whether the amity level is at least an amity threshold (decision 212). For example, among the amity levels noted above, the amity level of a stranger may relate to scenarios where the user and the individual do not know one another. Therefore, the user and the individual may not know each other's names. In another example, the amity level of an acquaintance or friend may relate to scenarios where the user and the individual have met before and likely introduced each other. Therefore, the user and the individual are likely to be aware or should be aware of the other's name. As a result of the voice analysis server 130 determining that the amity level is not at least the amity threshold such as the amity level being a stranger (decision 212, "NO" branch), the voice analysis server 130 may determine whether the user device 110 is still activated (decision 206).

As a result of the voice analysis server 130 determining that the amity level is at least the amity threshold such as the amity level being an acquaintance or friend (decision 212, "YES" branch), the voice analysis server 130 may analyze metadata of the individual's voice (step 214). That is, the conversation has proceeded without the user acknowledging the individual's name nor the individual providing the individual's own name (e.g., based on processing the recorded audio input) and relates to a scenario where the user should know the individual's name (e.g., based on the amity level of the conversation as recorded in the audio input). The voice analysis server 130 may generate the metadata of the individual's voice by determining a plurality of voice characteristics. The voice characteristics may include, for example, pitch, tone, dialect, etc.

The voice analysis server 130 may determine the name of the individual based on a probable match of the metadata of the individual's voice to a voice profile (step 216). The voice analysis server 130 may analyze the voice characteristics as indicated by the metadata to determine a matching voice profile as stored in the data repository 120. The voice profiles in the data repository 120 may be stored as voice samples that may also include metadata for the corresponding sample that may indicate voice characteristics. Through a comparison of the metadata of the individual's voice to the metadata of the voice samples in the data repository 120, the voice analysis server 130 may determine one or more matches based on a similarity score. Among the matches, the voice analysis server 130 may determine a probable match based on a highest one of the similarity score (e.g., when multiple matches are found).

The voice analysis server 130 may generate results and provide a corresponding output of the individual's name to the user device 110 (step 218). In determining the probable match between the individual's voice and the voice profile, the voice analysis server 130 may determine the associated name of the matching voice profile as well as other available information for the associated name (e.g., a spelling, a pronunciation guide, an audio playback of the name being uttered, an image of the individual, etc.). The voice analysis server 130 may transmit this information to the user device 110 such that the naming client 116 shows the results on the display device 114 and/or plays back the audio file of the name being uttered.

To further illustrate the operations of the voice analysis server 130 performing the method 200, reference is now made to an illustrative exemplary embodiment. The illustrative exemplary embodiment is directed towards a workplace environment in which the user is an employee and the individual is a co-worker whose name may not be recalled by the user. The illustrative exemplary embodiment describes the operations of the method 200 at a high level as well as with alternative features that may be incorporated.

According to the illustrative exemplary embodiment, the voice analysis server 130 may solve the issue of avoiding social embarrassment when the employee encounters a co-worker and does not recall the co-worker's name. The voice analysis server 130 may utilize speech recognition techniques and an artificial intelligence algorithm that determines various aspects including correct scenarios based on context and ultimately a name of the co-worker if the scenario calls for such a determination.

As the voice analysis server 130 (e.g., via the audio device 112 of the user device 110) picks up a voice in an audio input, the voice analysis server 130 and/or the user device 110 awakes from an idle state. The voice analysis server 130 may initiate analyzing the voice via speech recognition and/or voice to text. The voice analysis server 130 may simultaneously or separately perform further operations including name detection in which the voice analysis server 130 parses through the transient voice data of the audio input and looks for the co-worker's name, amity analysis using speech patterns that are processed through a classification algorithm that classifies the conversation between the employee and co-worker into an appropriate amity level (e.g., stranger, acquaintance, and friend) to determine the conversation amity degree, and voice character breakdown in which the audio input corresponding to the voice is processed to determine voice characteristics such as pitch, tone, dialect, etc.

The voice analysis server 130 may process one or more iterations of back and forth utterances between the employee and co-worker (e.g., reply and response). These iterations may correspond to a prescribed time as described above. The voice analysis server 130 may detect whether there is a greeting from the employee in which the co-worker's name is uttered. If a name is not detected, and an amity level is greater than a threshold (e.g., acquaintance or friend), the voice analysis server 130 may perform subsequent operations where the metadata of the voice of the co-worker is generated and provided.

The use of the subsequent operations may be triggered with an appropriate API call corresponding to a missing name in the employee's greeting. On receiving the API call, the voice analysis server 130 may use the metadata of the voice and compare the voice characteristics thereof with the voice characteristics of the voice profiles based on voice samples provided by the employees. The voice samples may include a pronunciation of the co-worker's name and any applicable nicknames or preferred names. The voice samples may also include one or more key phrases from which the voice characteristics may be extrapolated. According to an exemplary implementation, a similarity threshold between the voice and the voice profile may be set. For example, the similarity threshold may be 80%. Thus, when a voice is at least the 80% similarity threshold, the voice analysis server 130 may determine the corresponding voice profile and any associated information including the name, a phonetic pronunciation, and a sound byte to help with the correct pronunciation. In contrast, if the voice analysis server 130 determines that the similarity threshold is not met for any voice profile, the voice analysis server 130 may return a result that there is no match.

The voice analysis server 130 may be configured to perform further operations. For example, the metadata of the voice of the co-worker may be added to the voice profile of the co-worker. For example, the employee may confirm that the output from the voice analysis server 130 was correct. In this manner, the metadata of the voice of the co-worker may be used to update any model and processing operations. Accordingly, the artificial intelligence algorithm may be further trained for subsequent determinations. In another example, the voice analysis server 130 further train the models and artificial intelligence algorithm, particularly as a result of the employee uttering an incorrect name or a name that is not preferred by the co-worker. In a further example, even when the greeting includes the name of the co-worker, the voice analysis server 130 may incorporate any metadata to increase an accuracy of future determinations. In an exemplary implementation, any model, metadata, etc. as used by the exemplary embodiments may be stored in the data repository 120.

The exemplary embodiments are configured to determine scenarios where a user does not recall an individual's name during a conversation and to subsequently determine the name of the individual to be provided to the user. The exemplary embodiments utilize a fundamental component during the conversation in the form of the voice of the individual. The exemplary embodiments leverage the voice and a processing component to recognize the missing greeting or name where a backend algorithm learns and compares voice metadata with voice profiles to provide an on-demand name to help the user solve for social embarrassment as a result of failure of name recollection.

Figure 3:
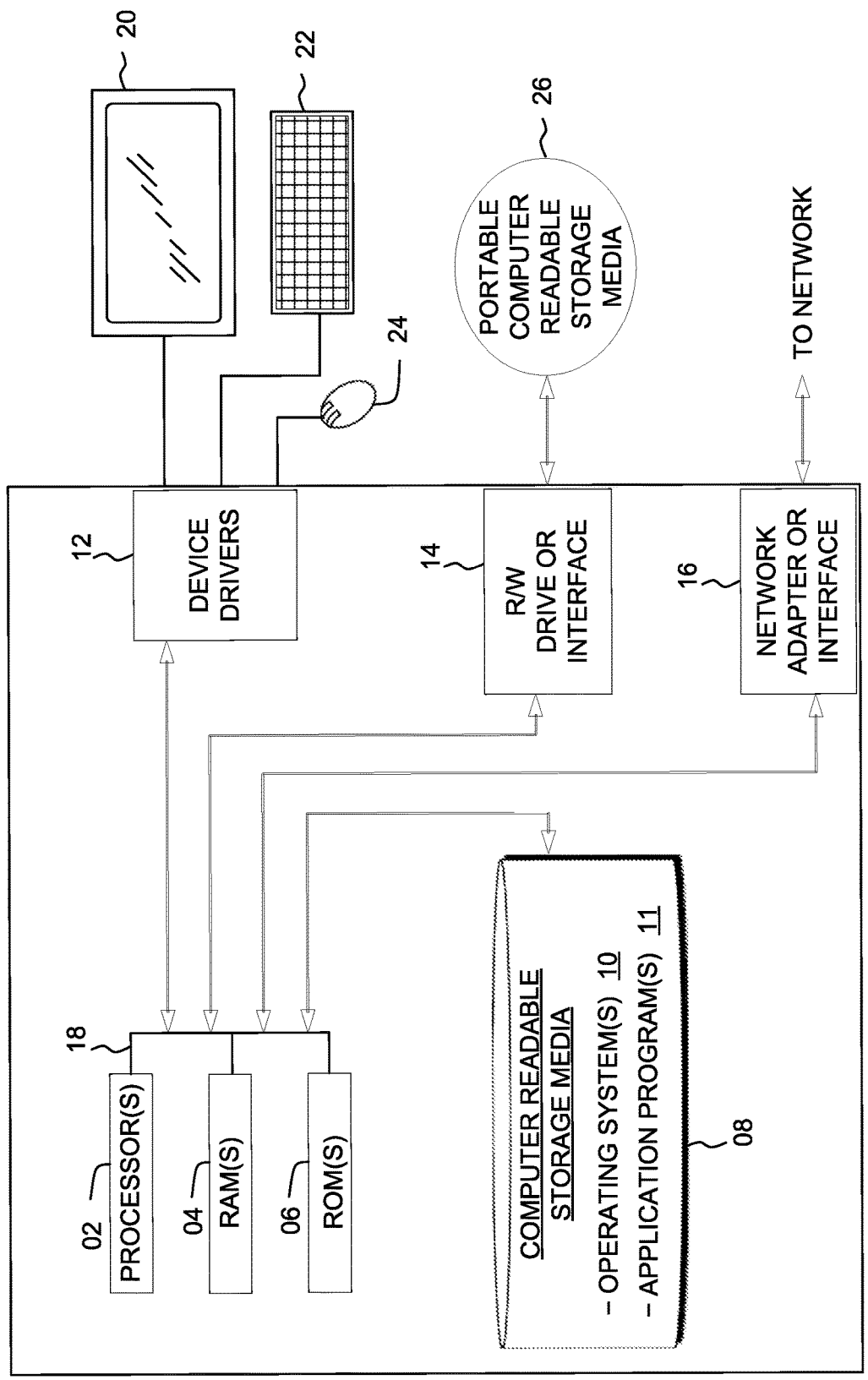
FIG. 3 depicts an exemplary block diagram depicting the hardware components of the individual recognition system 100 of FIG. 1, in accordance with the exemplary embodiments.

FIG. 3 depicts a block diagram of devices within the individual recognition system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, RAY drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
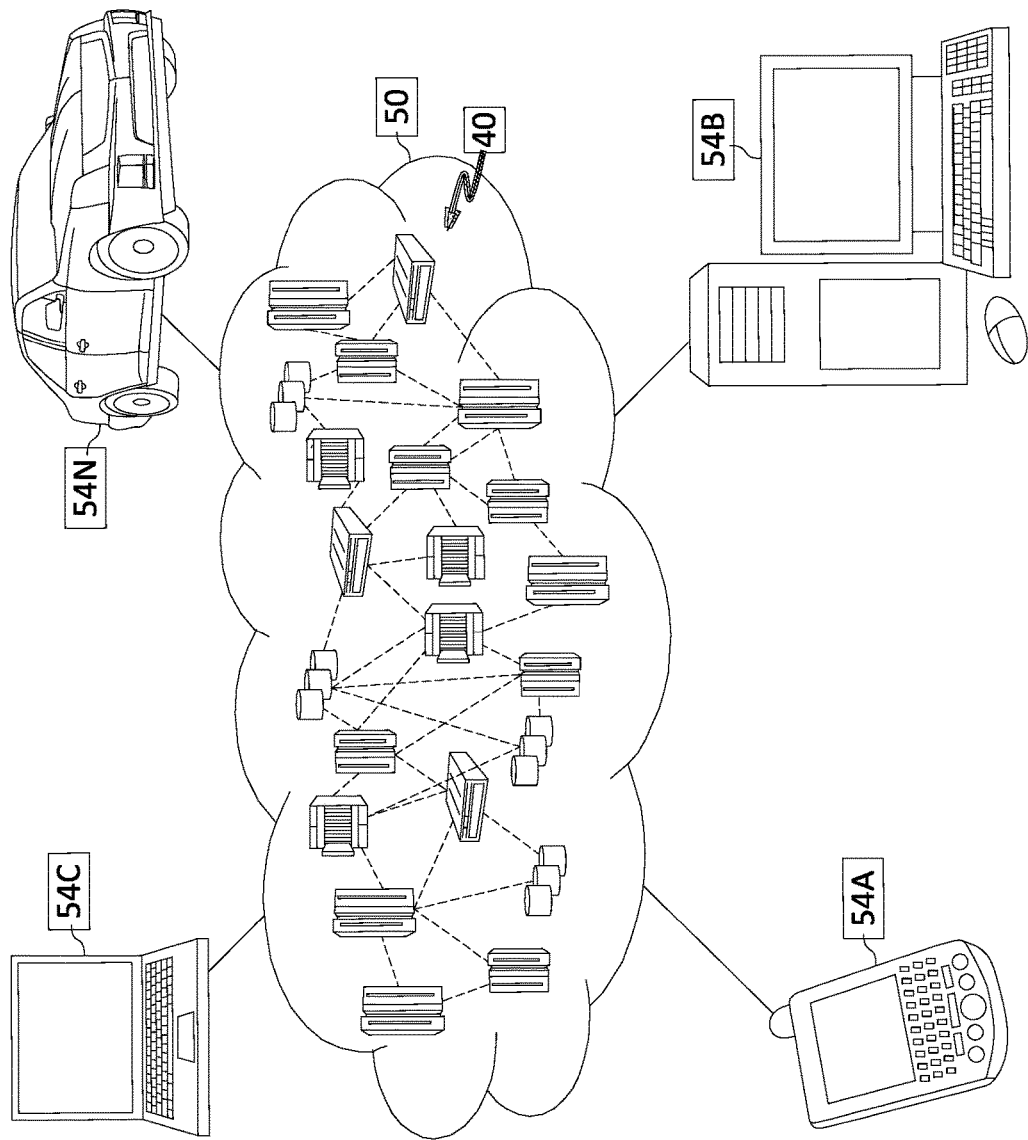
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
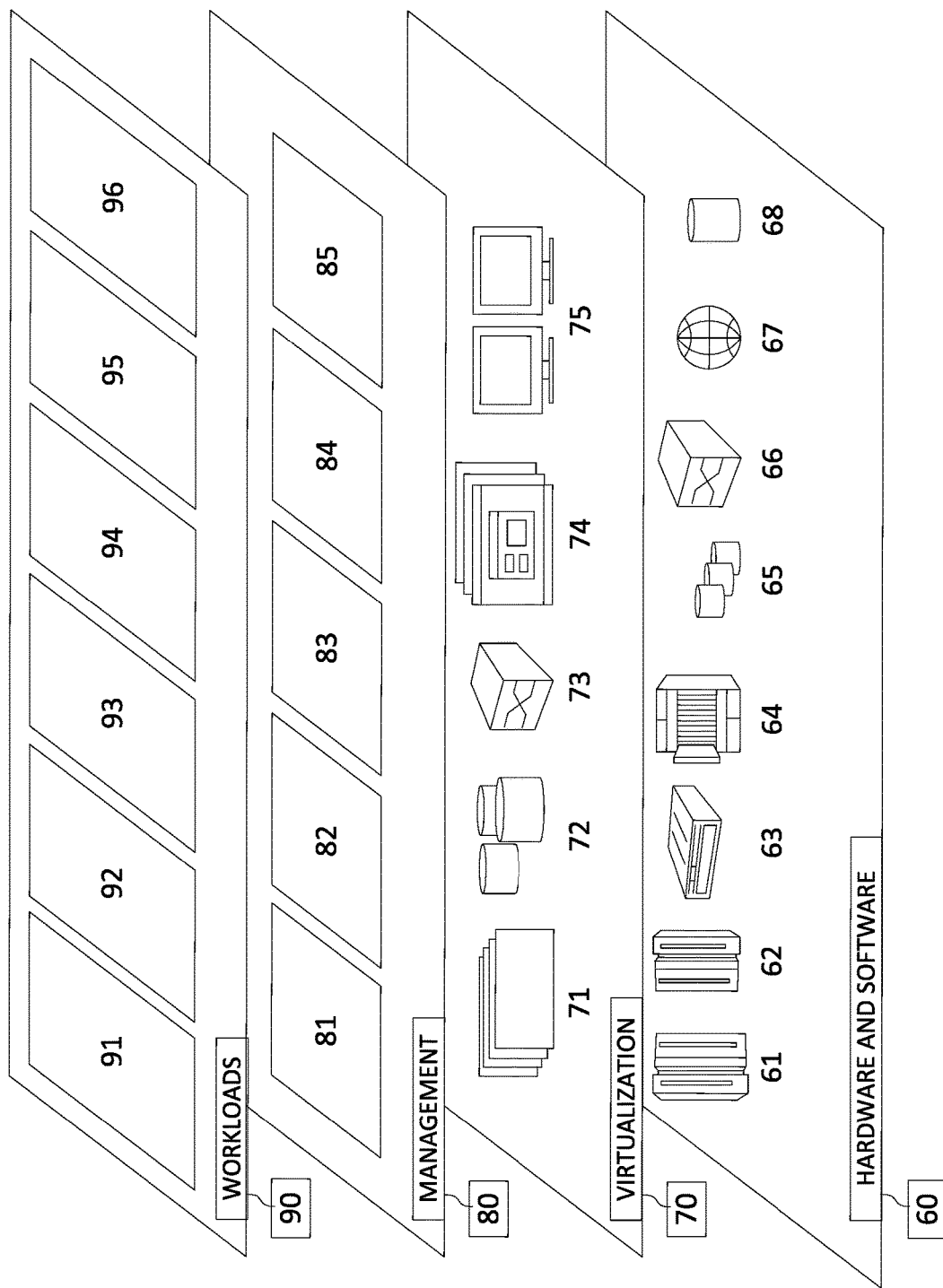
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and voice analysis processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for determining a name of an individual based on voice detection, the computer-implemented method comprising:
   receiving, by an audio input device, an audio input associated with a conversation between a user and the individual;
   recording, by the audio input device, the received audio input;
   determining voice characteristics of a voice of the individual based on the recorded audio input, wherein the audio input includes a decibel level of the conversation;
   instructing, based on the decibel level of the conversation, the audio input device to change from a passive state to an active state;
   determining that an amity level of the conversation is greater than a threshold value, wherein
   the amity level is one of an acquaintance or a friend, and
   the amity level is determined based on:
      the instructing of the audio input device to change from the passive state to the active state; and
      contextual information associated with specific words or phrases used in the conversation, the voice characteristics of the individual, and at least one of frequency of meetings between the user and the individual, a time since previous meeting between the user and the individual, or a time since first meeting between the user and the individual;
   comparing, based on the determination that the amity level is greater than the threshold value, the voice characteristics of the voice of the individual to voice characteristics of voice profiles;
   as a result of the voice and one of the voice profiles meeting a similarity threshold, determining the name associated with one of the voice profiles; and
   providing the name to the user who is having the conversation with the individual.

2. The computer-implemented method of claim 1, further comprising:
   monitoring an audio space in proximity to the user; and
   detecting a presence of speech in the audio input captured in the audio space, wherein the speech is associated with the conversation.

3. The computer-implemented method of claim 2, further comprising
   determining whether the conversation includes a named greeting, the named greeting being an utterance from one of the users or the individual including the name of the individual, wherein the voice characteristics are determined as a result of the named greeting being absent in the conversation.

4. The computer-implemented method of claim 1, wherein the voice characteristics include a tone, a pitch, and a dialect.

5. A computer-readable storage media that configures a computer to perform program instructions stored on the computer-readable storage media for determining a name of an individual based on voice detection, the program instructions comprising:
   receiving, by an audio input device, an audio input associated with a conversation between a user and the individual;
   recording, by the audio input device, the received audio input;
   determining voice characteristics of a voice of the individual based on the recorded audio input, wherein the audio input includes a decibel level of the conversation;
   instructing, based on the decibel level of the conversation, the audio input device to change from a passive state to an active state;
   determining that an amity level of the conversation is greater than a threshold value, wherein
      the amity level is one of an acquaintance or a friend, and
      the amity level is determined based on:
         the instructing of the audio input device to change from the passive state to the active state; and
         contextual information associated with specific words or phrases used in the conversation, the voice characteristics of the individual, and at least one of frequency of meetings between the user and the individual, a time since previous meeting between the user and the individual, or a time since first meeting between the user and the individual;
   comparing, based on the determination that the amity level is greater than the threshold value, the voice characteristics of the voice of the individual to voice characteristics of voice profiles;
   as a result of the voice and one of the voice profiles meeting a similarity threshold, determining the name associated with one of the voice profiles; and
   providing the name to the user who is having the conversation with the individual.

6. The computer-readable storage media of claim 5, wherein the program instructions further comprise:
   monitoring an audio space in proximity to the user; and
   detecting a presence of speech in the audio input captured in the audio space, wherein the speech is associated with the conversation.

7. The computer-readable storage media of claim 6, wherein the program instructions further comprise:
   determining whether the conversation includes a named greeting, the named greeting being an utterance from one of the users or the individual including the name of the individual, wherein the voice characteristics are determined as a result of the named greeting being absent in the conversation.

8. The computer-readable storage media of claim 5, wherein the voice characteristics include a tone, a pitch, and a dialect.

9. A computer system to determine a name of an individual based on voice detection, the computer system comprising:

one or more computer processors;
one or more computer-readable storage media; and
program instructions stored on the one or more of the computer-readable storage media, the program instructions executable by at least one processor of the one or more computer processors to cause the at least one processor;
receive, by an audio input device, an audio input associated with a conversation between a user and the individual;
record, by the audio input device, the received audio input;
determine voice characteristics of a voice of the individual based on the recorded audio input, wherein the audio input includes a decibel level of the conversation;
instruct, based on the decibel level of the conversation, the audio input device to change from a passive state to an active state;
determine that an amity level of the conversation is greater than a threshold value, wherein
the amity level is one of an acquaintance or a friend, and
the amity level is determined based on:
the instruction to the audio input device to change from the passive state to the active state; and
contextual information associated with specific words or phrases used in the conversation, the voice characteristics of the individual, and at least one of frequency of meetings between the user and the individual, a time since previous meeting between the user and the individual, or a time since first meeting between the user and the individual;
compare, based on the determination that the amity level is greater than the threshold value, the voice characteristics of the voice of the individual to voice characteristics of voice profiles;
as a result of the voice and one of the voice profiles meeting a similarity threshold, determine the name associated with one of the voice profiles; and
providing the name to the user who is having the conversation with the individual.

10. The computer system of claim 9, wherein the program instructions further cause the at least one processor to:
monitor an audio space in proximity to the user; and
detect a presence of speech in the audio input captured in the audio space, wherein the speech is associated with the conversation.

11. The computer system of claim 10, wherein the program instructions further cause the at least one processor to:
determine whether the conversation includes a named greeting, the named greeting being an utterance from one of the users or the individual including the name of the individual, wherein the voice characteristics are determined as a result of the named greeting being absent in the conversation.

* * * * *